(No Model.)

J. P. ALTIZER.
ELEVATOR STOP.

No. 589,682. Patented Sept. 7, 1897.

Witnesses:
E. D. Acker.
Joseph Housum.

Inventor.
Jesse P. Altizer.
By Wm. Zimmerman Att'y.

UNITED STATES PATENT OFFICE.

JESSE P. ALTIZER, OF CHICAGO, ILLINOIS.

ELEVATOR-STOP.

SPECIFICATION forming part of Letters Patent No. 589,682, dated September 7, 1897.

Application filed March 29, 1897. Serial No. 629,758. (No model.)

*To all whom it may concern:*

Be it known that I, JESSE P. ALTIZER, a citizen of the United States, residing at Chicago, in the county of Cook and State of Illinois, have invented certain new and useful Improvements in Elevator-Stops, which are fully set forth in the following specification, reference being had to the accompanying drawings, forming a part hereof, in which—

Figure 1:
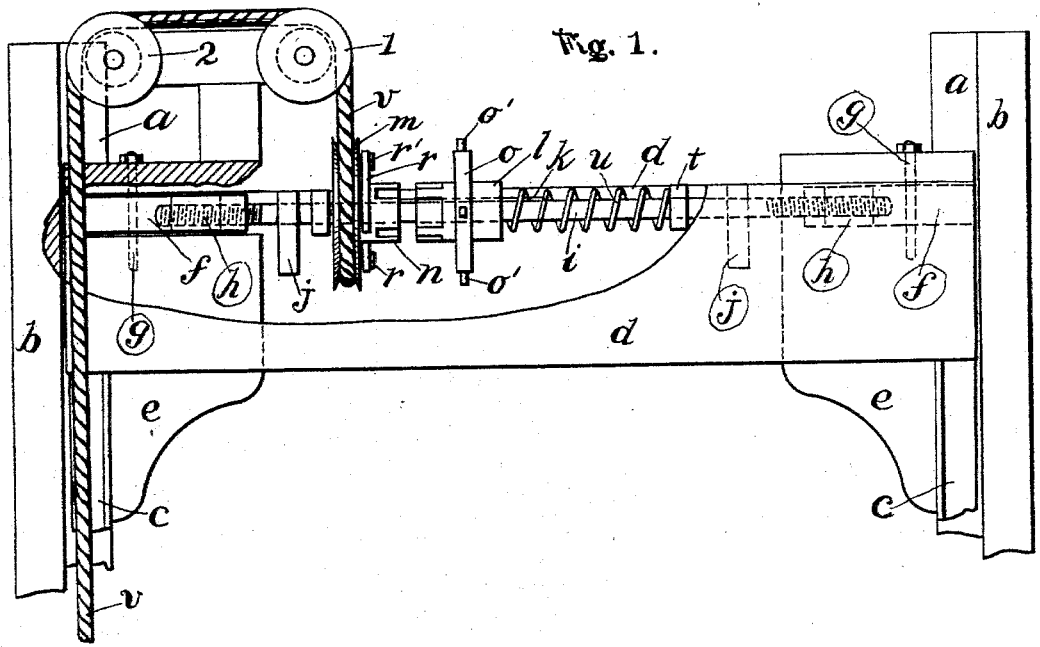
Figure 3:
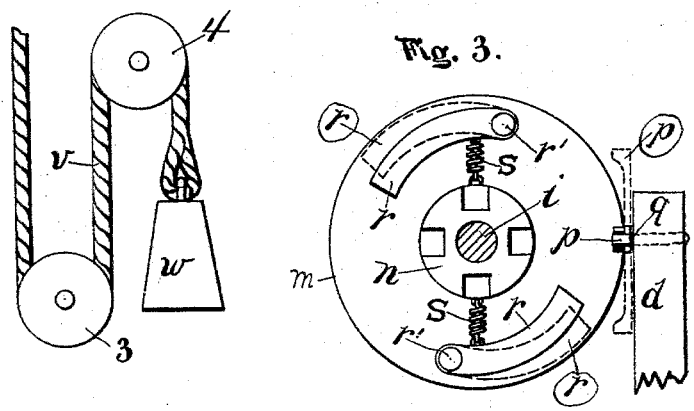
Figure 2:
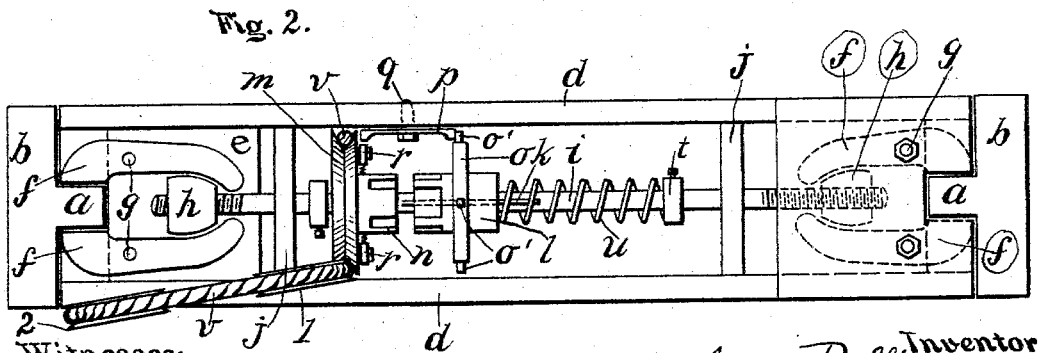

Figure 1 shows my said new device in side elevation, partly in section and with the lower portion broken away. Fig. 2 shows the same in plan view or as seen from the top. Fig. 3 shows a front view of the shive $m$, together with a fragment of one of the bars $d$, with the stop $p$ in locked position, its unlocked position being indicated in broken outlines.

Like letters and figures of reference refer to like parts.

The object of my invention is to produce a device for stopping the cage of an elevator when its hoisting-rope breaks by such clamping mechanism as will clamp to the guides and insure its stopping and at the same time do it without any violent motion or jar, also by the same means arrest the cage in its ascent at the upper end of the guides. To attain said desirable ends, I construct my said new device in substantially the following manner, namely:

To the top of the cage or parts $c$ and brackets $e$ I attach bars $d$, to which the hoisting-rope is fastened. (Not here shown.) To said brackets or blocks $e$ I attach curved levers $f$, fulcrumed at $g$ in the blocks $e$ and so placed that their short jaw-like ends will move closely but freely to said guides $a$, attached to the posts $b$. The curved ends of said levers approach each other, and between them are nuts $h$, which work on the ends of a shaft $i$, having threads cut oppositely and working in said nuts. Near the blocks $e$ are transverse bars $j$, serving as bearings, through which passes said shaft $i$. On said shaft are collars $t$, placed so as to leave suitable free space for the automatic longitudinal adjustment of said shaft, so that it may adapt itself to and bring both of said nuts into action together. On said shaft is placed a free shive $m$ with a hub forming with the sliding hub $l$ of a wheel or arm $o$ a clutch $n$. Said hub slides on a feather $k$ and is projected into the other hub by a coiled spring around said shaft resting on the collar $t$. On the wheel $o$ are spurs $o'$, which reach a stop $p$, which is a simple bar or "button" turning on a pivot $q$, fastened to one of the sides $d$, whereby the clutch $n$ is held open. From a short distance above the topmost place to which the elevator ascends descends a rope $v$ (not shown in said upper position) and passes under the sharply-grooved shive $m$, and thence upward over the shives 1 2, and thence down into the basement of the building or like place, where it passes over the shives 3 4, after which its end is connected to a weight $w$ to keep the rope taut. To the face of the shive $m$ are attached arms $r$, which are held and turn on pins $r'$. Near said pins are springs $s$, which draw the free ends of said arms inward with sufficient force to prevent them from touching said button $p$ during the ordinary-speed revolution of said shive, but so arranged that whenever its speed becomes abnormal, as it would when the hoisting-rope breaks, the increased centrifugal force will throw said arms outward and cause the free end of one of said arms to strike said button $p$ and turn it from the spur $o'$, thus releasing the hub $l$, which is then thrown forward by the spring $u$, whereby the clutch mechanism becomes engaged and the shaft $i$ revolves and draws the nuts $h$ toward its center, thereby causing the curved arms $f$ to spread at those ends and the other ends thereof which form jaws to approach and pinch the guides $a$ until by their constantly-increasing pinch they cause the elevator to stop by a gradual motion within a few feet.

What I claim is—

1. The combination with an elevator-car and its guides, a shaft with right and left handed threads and non-revoluble nuts at its ends, a clutch element feathered on its shaft, a shive loose on the shaft, and a clutch member affixed thereto, and means to rotate said shive mechanism, mechanism tending to engage said clutch parts, means to normally hold said clutch elements apart and means to release said holding means, said releasing means being dependent for its action on the speed of the travel of said car, of levers connected to and actuated by said nuts, fulcrumed and placed to pinch said guides, substantially as specified.

2. The combination with an elevator-car and its guides, of a right and left handed screw-threaded shaft provided with a clutch member, feathered on the shaft, and a shive loose on the shaft, and a clutch member affixed thereto, and means to rotate said shive, and means tending to engage said clutch elements, means to normally hold said clutch elements apart, and centrifugally-acting mechanism to release said holding elements, and non-revoluble nuts on said threaded shaft ends, and levers connected to and actuated by said nuts, fulcrumed and placed to pinch said guides, substantially as specified.

JESSE P. ALTIZER.

Witnesses:
WM. ZIMMERMAN,
JOSEPH HONSUM.